Figure 1:
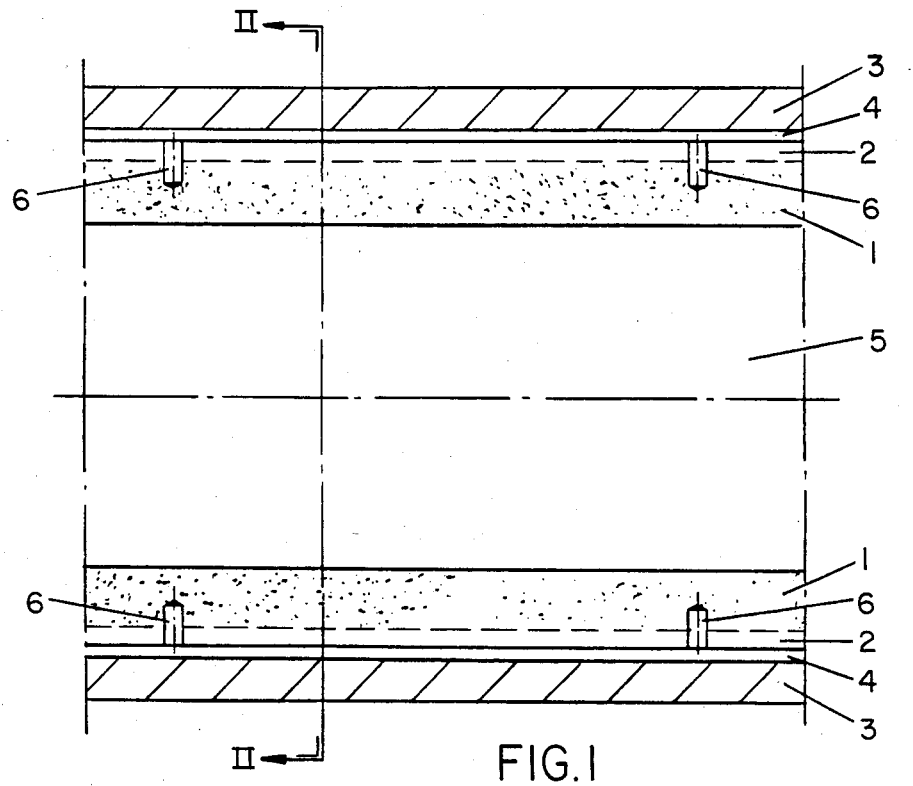

United States Patent [19]

Lind

[11] Patent Number: 4,744,676
[45] Date of Patent: May 17, 1988

[54] GAS BEARING AND METHOD OF MAKING IT

[75] Inventor: Björn Lind, Billdal, Sweden

[73] Assignee: SKF Nova AB, Goteborg, Sweden

[21] Appl. No.: 946,829

[22] Filed: Dec. 29, 1986

[30] Foreign Application Priority Data

Mar. 18, 1986 [SE] Sweden ............................ 8601258

[51] Int. Cl.⁴ .............................................. F16C 32/06
[52] U.S. Cl. .................................... 384/115; 384/114; 384/279; 384/902
[58] Field of Search ............... 384/114, 115, 113, 279, 384/902

[56] References Cited

U.S. PATENT DOCUMENTS 3,527,510  9/1970  Christiansen ..................... 384/279
4,030,784  6/1977  King et al. ........................ 384/279

FOREIGN PATENT DOCUMENTS 3110712  3/1981  Fed. Rep. of Germany .

Primary Examiner—Lenard A. Footland
Attorney, Agent, or Firm—Eugene E. Renz, Jr.

[57] ABSTRACT

The invention relates to a gas bearing with a bearing surface arranged on a gas permeable element to which a pressure medium can be supplied from an external source. The bearing surface is arranged on a less permeable surface layer, through which holes are made. In order to ensure good gas flow through the holes, the holes extend into the porous material a distance corresponding to at least half the diameter of the holes, and those portions of the holes which are situated inside said surface layer are limited by porous material.

3 Claims, 1 Drawing Sheet

GAS BEARING AND METHOD OF MAKING IT

The invention relates to a gas bearing of the kind described in the introductory clause of claim 1, and to a method of manufacturing such a bearing.

A gas bearing substantially as described in the introductory clause of claim 1 is known from, e.g. DE Offenlegungsschrift No. 3,110,712. This publication shows embodiments comprising a porous element with a surface layer in which holes are made. The surface layer is produced separately and the holes are made in this layer only, which entails some disadvantages regarding function as well as manufacturing economy. It is comparatively expensive to produce, work, apply and take up holes in a separate surface layer. Furthermore, the holes communicate with the porous element over a flat surface, which is comparatively small, so that the flow through each hole depends on the position of the hole on the porous element, i.e. how many and large are the pore openings situated on that surface portion of the element which is limited by the hole. Another problem is that if the holes are bored in a drilling operation when the surface layer is situated on the porous element, the drilling tool may cause the pores in the porous element to be closed, so that a gas flow through the hole is prevented. It is suggested in the above-mentioned publication that the holes may be produced by a chemical process instead of by a mechanical method, but the procedures suggested are complicated, expensive and time consuming.

One purpose of the present invention is to provide a gas bearing of the kind described, in which the holes taken through the surface layer are accurately shaped and their connection to the porous material is such that a good gas permeability is always guaranteed. Another purpose is to provide a method by which a gas bearing according to the first mentioned aspect of the invention can be produced quickly, easily, inexpensively and with a high precision.

The first mentioned purpose is achieved by giving the gas bearing the characterizing features stated in claim 1. Suitable embodiments are defined in the claims depending on claim 1. The last mentioned purpose is achieved by the method defined in claim 5.

Figure 2:
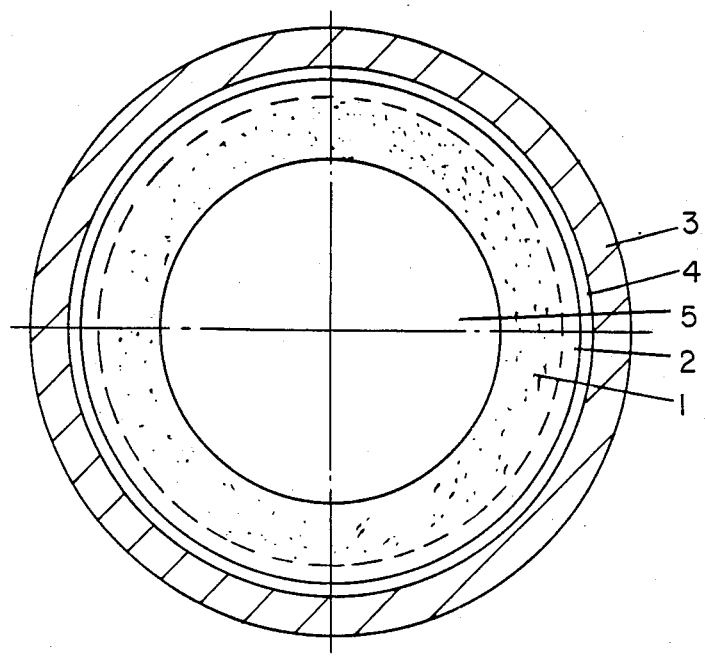

The following is a detailed description of the invention with reference to the accompanying drawing, in which:

FIG. 1 shows a longitudinal section of the outlines of a bearing according to an embodiment of the invention; and FIG. 2 shows a cross section according to II—II in FIG. 1.

A gas permeable element 1 in the shape of a cylinder has a surface layer 2 on its envelope surface. The element 1 is made of a porous material, e.g. sintered bronze, and the surface layer 2 can be made by mechanical working of the porous material, e.g. by grinding, so that the pore openings are closed completely or partly and the gas permeability of the layer ceases or decreases.

A member 3, e.g. a sleeve, which is rotatable in relation to the element 1, encloses element 1. Member 3 and element 1 are separated by a gap 4. A pressure medium in the form of a gas, e.g. air, is supplied to the gap 4 via the gas permeable element 3 via a central bore 5 in element 1 and from a source of pressure medium, not shown, in a manner known per se. It is difficult to obtain a proper restriction of the flow in the surface layer 2 by a grinding operation alone. The gas permeability often gets too low or too high, depending on the properties of the porous material and on which grinding procedure is used. For this reason the surface of the element 1 of the described embodiment of the invention is treated so that the gas permeability is definitely low, e.g. by grinding in a centerless grinding machine and possibly coating with a glue layer, and thereafter a number of holes 6 are taken up in the element. The holes are taken up through the surface layer and extend into the porous material a distance corresponding to at least half the diameter of the holes, those portions of the hole walls which are situated inside of said surface layer being limited by a porous material. The holes are suitably taken up perpendicular to the surface layer 2, and they can form a number of annular rows around the element 1, so that the gas is introduced through the holes to the gap 4 at desired positions. The holes may possibly be arranged in other ways, e.g. as one or more helical rows around the element 1. As the holes extend a certain distance into the porous material, the gas flowing through the porous material can flow into the holes comparatively uninterrupted through comparatively large surfaces which enclose the inner portions of the holes. It is important that the holes are taken up in such a way that the surface layers which limit the holes in the porous portion of the element 1 are not closed by the working operation. For this reason it is unsuitable to use conventional drilling methods. Instead a device is used, e.g. a so-called laser gun, known per se, by which holes of desired depths can be made by gasification of the worked material without the pores being closed in adjoining portions of the porous part of the element 1. The holes can thereby be made narrow, suitably between 0.01 and 1 mm in diameter, and arranged so close to each other than an evenly distributed gas flow to the gap 4 is obtained at the same time as the flow through the surface layer is so restricted that a desired stiffness in the bearing is obtained. The bottoms of the holes have about semi-spherical shape, and to make sure that the holes have constant cross section areas through the whole surface layer, the holes extend into the porous material a distance corresponding to at least half the diameter of the holes. This also makes the hole wall surface area in the porous material greater than it would be if the holes were extending through the surface layer 2 only, which gives a better and more predictable gas flow.

A cylinder 1 of sintered bronze may have a length of about 30 mm and an outer diameter of about 20 mm, holes 6 being arranged in rows situated about 6 mm from each end of the cylinder. 16 holes with a diameter of 130 $\mu$m give an air flow through the bearing of 150 l/h from a pressure source with 3 HPa overpressure when the gap 4 is about 18 $\mu$m.

The cylindrical bearing described above is only one of a number of possible embodiments of the invention, which is also useful in e.g. thrust bearings, and the bearing surface can be flat, conical, spherical or have another shape. The porous material is not necessarily metallic, and the less permeable surface layer can be made in other ways than by mechanical working and possibly glueing, e.g. by various chemical methods.

What is claimed is:

1. A gas bearing with a bearing surface arranged on a sintered gas permeable element (1) to which a pressure medium can be supplied from an external source and flow through the element to the bearing surface, the element being made of a gas permeable porous material and having a bearing surface on a less permeable surface layer of said gas porous material (2) through which a number of holes (6) are made, characterized in that the holes extend into the porous material a distance corresponding to at least half the diameter of the holes, so that those portions of the holes which are situated inside surface layer (2) are limited by a porous material; and wherein the holes (6) have a diameter of between 0.01 and 1 mm.

2. A gas bearing according to claim 1, in which the bearing surface is cylindrical and arranged on the exterior around an element (1) of a porous material.

3. A gas bearing according to claim 1, in which the surface layer (2) is a portion of the element which is mechanically worked.

UNITED STATES PATENT AND TRADEMARK OFFICE
CERTIFICATE OF CORRECTION

PATENT NO. : 4,744,676

DATED : May 17, 1988

INVENTOR(S) : Björn Lind

It is certified that error appears in the above-identified patent and that said Letters Patent is hereby corrected as shown below:

On the Title Page, Item [73], Assignee:, "SKF Nova AB, Goteborg, Sweden" should read --Aktiebolaget SKF, Goteborg, Sweden--.

Signed and Sealed this

Second Day of May, 1989

Attest:

DONALD J. QUIGG

*Attesting Officer*      *Commissioner of Patents and Trademarks*